United States Patent
Sprenger et al.

(10) Patent No.: US 6,920,031 B2
(45) Date of Patent: Jul. 19, 2005

(54) STATIC CHARGE NEUTRALIZER

(75) Inventors: Gregory S. Sprenger, Colorado Springs, CO (US); Michael J. Gish, Colorado Springs, CO (US)

(73) Assignee: Velcon Filters, Inc., Colorado Springs, CO (US)

( * ) Notice: Subject to any disclaimer, the term of this patent is extended or adjusted under 35 U.S.C. 154(b) by 0 days.

(21) Appl. No.: 10/814,491

(22) Filed: Mar. 31, 2004

(65) Prior Publication Data

US 2004/0212945 A1 Oct. 28, 2004

Related U.S. Application Data

(60) Provisional application No. 60/465,063, filed on Apr. 24, 2003.

(51) Int. Cl.[7] ............................................. H05F 3/02
(52) U.S. Cl. ....................................................... 361/231
(58) Field of Search ................................ 361/230, 215, 361/216, 231

(56) References Cited

U.S. PATENT DOCUMENTS

| 3,383,560 | A |   | 5/1968  | Ginsburgh |   |
|-----------|---|---|---------|-----------|---|
| 3,619,718 | A |   | 11/1971 | Leonard   |   |
| 3,768,659 | A | * | 10/1973 | Miller    | 210/313 |
| 3,957,264 | A | * | 5/1976  | Bach et al. | 271/287 |
| 4,999,108 | A | * | 3/1991  | Koch et al. | 210/243 |
| 5,076,920 | A | * | 12/1991 | Danowski et al. | 210/243 |
| 5,380,432 | A | * | 1/1995  | Brandt    | 210/243 |
| 5,517,975 | A | * | 5/1996  | Iwata     | 123/538 |
| 5,881,702 | A | * | 3/1999  | Arkfeld   | 123/538 |
| 5,898,559 | A |   | 4/1999  | Smith     |   |
| 5,898,560 | A | * | 4/1999  | Flaynik et al. | 361/215 |
| 6,099,726 | A |   | 8/2000  | Gembolis et al. |   |
| 6,145,391 | A |   | 11/2000 | Pui et al. |   |
| 6,464,870 | B1 | * | 10/2002 | Castellanos et al. | 210/243 |

FOREIGN PATENT DOCUMENTS

| GB | 2 367 507 A  | 4/2002 |
| JP | 2000300917 A | 10/2000 |
| WO | WO 02/51215 A1 | 6/2002 |

* cited by examiner

Primary Examiner—Brian Sircus
Assistant Examiner—Zeev Kitov
(74) Attorney, Agent, or Firm—Fraser Martin Buchanan Miller LLC; Donald R. Fraser

(57) ABSTRACT

A hydrocarbon fluid filter monitor cartridge having apparatus for neutralizing the electrostatic charge in the transient fluid including a mass of filter material, and electrical conductor having a main conductive path and a plurality of cooperating electrically conductive paths extending from the main conductive path, and means for directing the flow of hydrocarbon fluid to be treated through the mass of filter material and in contact with the conductor whereby the electrostatic charge in the transient fluid is neutralized by corona discharge.

12 Claims, 2 Drawing Sheets

STATIC CHARGE NEUTRALIZER

This application claims the benefit of U.S. Provisional Patent Application Ser. No. 60/465,063 filed Apr. 24, 2003.

BACKGROUND OF THE INVENTION

1. Field of the Invention

This invention relates to a method and apparatus for minimizing the electrostatic charges developed in transient flowing fluids, such as hydrocarbon fuels, using the corona discharge method.

The accumulation of electrical charges in a moving fluid has long been a problem to the safe handling of flammable liquids. There are numerous instances where static charges have accumulated to levels high enough to cause a discharge of sufficient intensity that ignition of the flammable liquid resulted.

The most prevalent of the electrostatic induced accidents has been in connection with tank truck and storage vessel loading operations. The spark discharge in such instances occurs between the surface of the charged fluid in the tank or vessel and some component of the tank or vessel system such as reinforcing members, gauge markers, or the loading spout. This type of sparking is internal and can occur whether or not the tank or vessel is grounded to the loading pipe assembly.

A number of methods have been employed to reduce the safety hazards involved in handling flammable hydrocarbon fluids. Among them are: (a) relaxation tanks wherein the charge on the liquid is allowed to dissipate naturally, in the absence of air, before the liquid enters the receiving tank, (b) the use of a static dissipater additive to increase the conductivity of the liquid and thereby promote the rapid dissipation of charge, and (c) the static charge neutralizer, which employs pointed electrodes protruding from a plastic lining of a pipe into the flowing liquid to dissipate the charge by means of a lightning rod effect. Relaxation tanks are impractical where low-conductivity liquids must be moved at high flow rates since the size of the tank required to reduce the charge on the liquid to a safe level becomes prohibitively large. Although the static dissipater additive protects the product during all phases of handling, it does have the disadvantage of interfering with the water separator characteristics in the instances where it's being used on a fuel. The static charge neutralizer employs a continuous corona inside the moving liquid to neutralize the charge.

In many liquid-hydrocarbon-handling systems, the filter is possibly the greatest single cause of static electricity buildup in such systems. This is mainly due to its large surface area which allows great amounts of charge separation at the filter surface and liquid interface. This mechanism results in the generation of high electrostatic charges. Also, there is a tendency to locate filters close to the loading point. As a consequence, when the liquid is discharged into a tank or vessel it is in a highly charged and dangerous condition.

2. Description of the Prior Art

Filter cartridges containing tight filter media, by nature generate electrostatic charges, which flow with the fuel as it exits the filter. A 2" OD outside-in flow filter/monitor, used routinely as the last filtration step before fuel is loaded onto an aircraft, generates the highest charging due to its construction and flow path.

For many years, anti-static additives have been used in jet fuel to reduce electrostatic charging. This has been the single most important factor leading to lower fire hazards for aircraft. This additive works by increasing the electrical conductivity of the fuel, allowing static charges to dissipate by flowing through the fuel itself to ground. This process typically occurs in a few seconds. However, this additive can act as a pro-static agent on refueling vehicles containing these filter/monitors, increasing electrostatic charging. Charging is much higher on vehicles and spark discharges occur routinely inside the pressure vessels containing these filter/monitors. If air is present inside these pressure vessels while electrostatic spark discharges occur, the risk of fire and explosion is high.

There is a real need to reduce this charging in current systems. These inventors have developed a device, which attaches to the end of the monitor cartridge (patent pending). This is not the preferred solution. It is most advantageous to build in this static charge reduction into the present monitor cartridge.

Previous patents (e.g. U.S. Pat No. 3,619,718 by Leonard) address charge reduction methods which utilize the triboelectric effect of differing materials. Materials such as glass charge positively, while materials such as polyester charge negatively. Using materials, which charge with opposite polarity, the charge could be neutralized inside the cartridge. However, filter media vary in fiber diameter, density, surface coatings, etc. which makes this approach very difficult in practice. In addition, industry qualification specifications require these filter/monitors to perform a variety of functions, which limit the opportunity to utilize the triboelectric effect in filter/monitor design.

It is an object of the present invention to produce an apparatus which will minimize the safety hazard caused by the build-up of static electricity in moving liquids.

Another object of the invention is to produce an apparatus which will prevent the build-up of electrostatic charges to levels high enough to cause an ignition spark in liquid hydrocarbon handling systems.

Still a further object of the invention is to produce an apparatus to effect a neutralization of accumulated electrostatic charge upon a flowing hydrocarbon liquid.

A further object of the invention is to produce a fuel filter/monitor wherein the inner support area is made to immediately neutralize static charges in a transient hydrocarbon fluid passing therethrough.

A further object of the invention is to produce a fuel filter/monitor wherein the inner support area includes branched conductive paths where the charge can be neutralized.

Still another object of the invention is to produce a fuel filter/monitor capable of neutralizing the filter generated electrostatic charge in the transient hydrocarbon fluid using the corona discharge method.

SUMMARY OF THE INVENTION

The above objects and advantages of the invention can be achieved by an apparatus for neutralizing the electrostatic charge in hydrocarbon fluids comprising a mass of filter material; an electrical conductor having branched conductive paths; and means for directing the flow of hydrocarbon fluid to be treated through the mass of filter material and in contact with the conductor, whereby the electrostatic charge in the fuel is neutralized by corona discharge.

BRIEF DESCRIPTION OF THE DRAWINGS

The above as well as other objects and advantages of the invention will become readily apparent to those skilled in the art from reading the following detailed description of an embodiment of the invention when considered in the light of the accompanying drawings in which.

DETAILED DESCRIPTION OF THE PREFERRED EMBODIMENT

Figure 1:
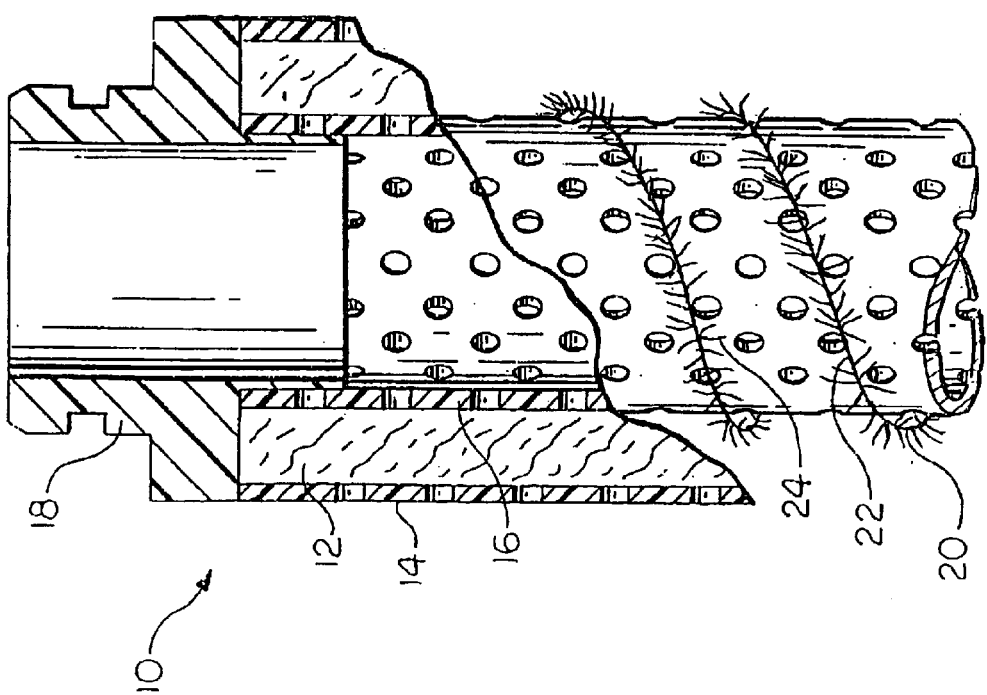
FIG. 1 is a fragmentary elevational view partly in section of a fuel filter monitor cartridge incorporating a static charge neutralizer embodying the features of the invention.

With reference to FIG. 1 of the drawings, there is illustrated a filter/monitor cartridge generally indicated by reference numeral 10.

The cartridge 10 is typically comprised of a cylindrical filter medium 12 disposed between two substantially coextensive coaxial spaced apart tubes 14, 16, each having a plurality of apertures permitting the flow of fuel therethrough.

The filter media 12 used in the cartridge 10 is capable of adsorbing water and filtering particulate solid contaminants that may be present in the transient fuel. The lower end of the cartridge, not shown, is typically provided with a solid end cap and the opposite end is provided with the hollow end cap 18. Both end caps are typically adhered to the filter media to minimize the possibility of bypassing the media, and simultaneously militating against the transmission of water.

It will be appreciated that the fuel being treated flows outside-in through the filter/monitor cartridge 10. As the fuel travels through and exits the filter media 12 of the cartridge 10, it becomes electrostatically charged. As the charged fuel flows through the filter media 12 toward the center of the tubular cartridge 10 and the flow tends to become turbulent and is caused to contact portions of a strip 20 of electrically conducive material. The strip 20 can be referred to as tinsel having a main elongate body 22 with a plurality of threads 24 extending outwardly from the body 22. The strip 20 may be wrapped as a helical fashion around the outer surface of the innermost tube 16, or may be disposed to extend linearly.

The strip 20 is typically connected to ground through any suitably arranged electrical conductor, not shown, which may be designed to exit the filter/monitor cartridge 10 through one or the other of the end caps.

Due to the insulative nature of the filter material, a high voltage tends to build up which may exceed 50 kV. The voltage draws charges from the pressure vessel, transferring the charge into the fuel. The polarity of the voltage field will cause either electrons to be transferred into the fuel or to exit the fuel; in either case, to neutralize the existing charges present in the fuel.

There are no active neutralization functions, such as electrical power supplies or radiation sources, which would require further maintenance. Although typical charge generation of the filter/monitors is positive polarity, the device of the invention, based on corona discharge, can neutralize either positive or negative charges.

Figure 2:
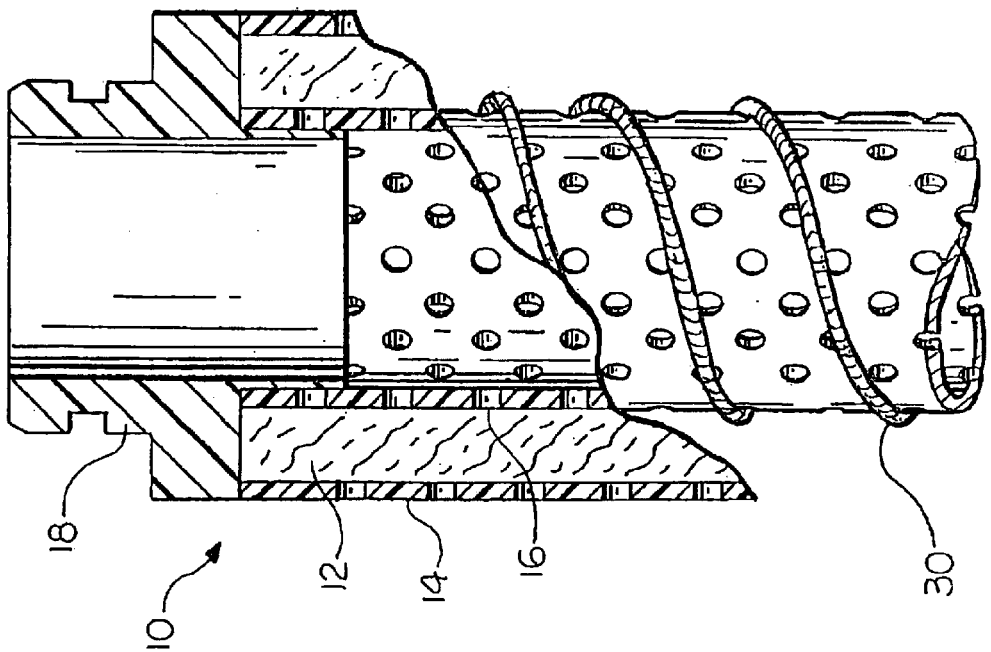
FIG. 2 is a view similar to that illustrated in FIG. 1 showing an alternative embodiment of the invention.

An alternative embodiment of the invention is illustrated in FIG. 2 wherein there is shown a filter/monitor cartridge generally indicated by reference numeral 10' which is comprised of more of the identical structural elements as in the embodiment illustrated in FIG. 1. The cartridge 10' is typically comprised of a cylindrical filter medium 12 disposed between two substantially coextensive coaxial spaced apart tubes 14, 16 each having a plurality of apertures permitting the flow of fuel therethrough.

The filter media 12 used in the cartridge 10 is capable of adsorbing water and filtering particulate solid contaminants that may be present in the transient fuel. The lower end of the cartridge, not shown, is typically provided with a solid end cap and the opposite end is provided with the hollow end cap 18. Both end caps are typically adhered to the filter media to minimize the possibility of bypassing the media, and simultaneously militate against the transmission of water.

It will be appreciated that the fuel being treated flows outside-in through the filter/monitor cartridge 10'. In use, as the fuel travels through and exits the filter media 12 of the cartridge 10', it becomes electrostatically charged. As the charged fuel flows through the filter media 12 toward the center of the tubular cartridge 10' and the flow tends to become turbulent and is caused to contact portions of a cord 30 of electrically conducive material. The cord 30 has many individual members with spaced apart points. The cord 30 may be wrapped as a helical fashion around the outer surface of the innermost support tube 16, or may be disposed to extend in a more linear manner adjacent to the tube 16.

The cord 30 is typically connected to ground through any suitably arranged electrical conductor, not shown, which may be designed to exit the filter/monitor cartridge 10' through one or the other of the end caps.

Figure 3:
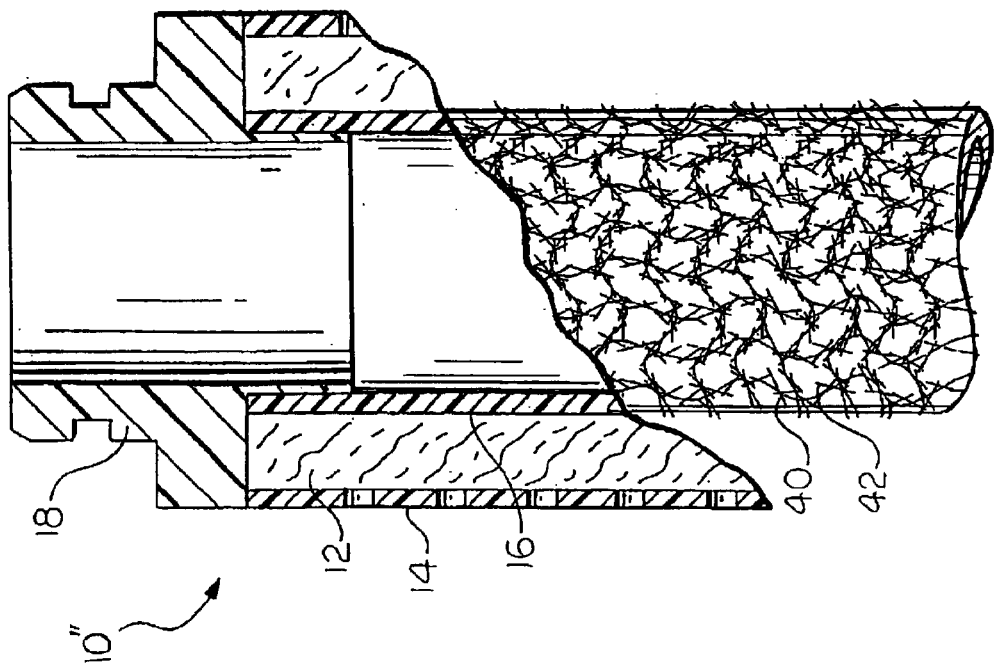
FIG. 3 is a view similar to the previous figures showing an alternative embodiment of the invention wherein the cartridge utilized an electrically conductive mesh-like fabric encircling the center perforated tube thereof.

A further embodiment of the invention is illustrated in FIG. 3 wherein the principle structural features of the cartridge 10" are identical to corresponding elements of the cartridges 10 and 10' of FIGS. 1 and 2, respectively. For sake of simplicity, corresponding elements will be indicated with the same reference numerals as utilized in FIGS. 1 and 2. Since the structure and function of these elements are the same as heretofore described, no further explanation is deemed necessary.

However, the embodiment of FIG. 3 is provided with a mesh material 40 fabricated of fibers 42 typically of an electrically conductive material such as stainless steel, for example. The fibers 42 are relatively short, such that the fibers are spun to form a thread which is then woven into the open mesh material 40. The short fibers 42 create points in the mesh material 40 which function as lightning-rod type structures to attract electric charges in the transient fluid and conduct the charges through a ground connection (not shown) in the associated cartridge 10".

It has been found that successful results were obtained by utilizing a mesh fabric manufactured and sold by N. V. Bekaert S. A. of Belgium.

Figure 4:
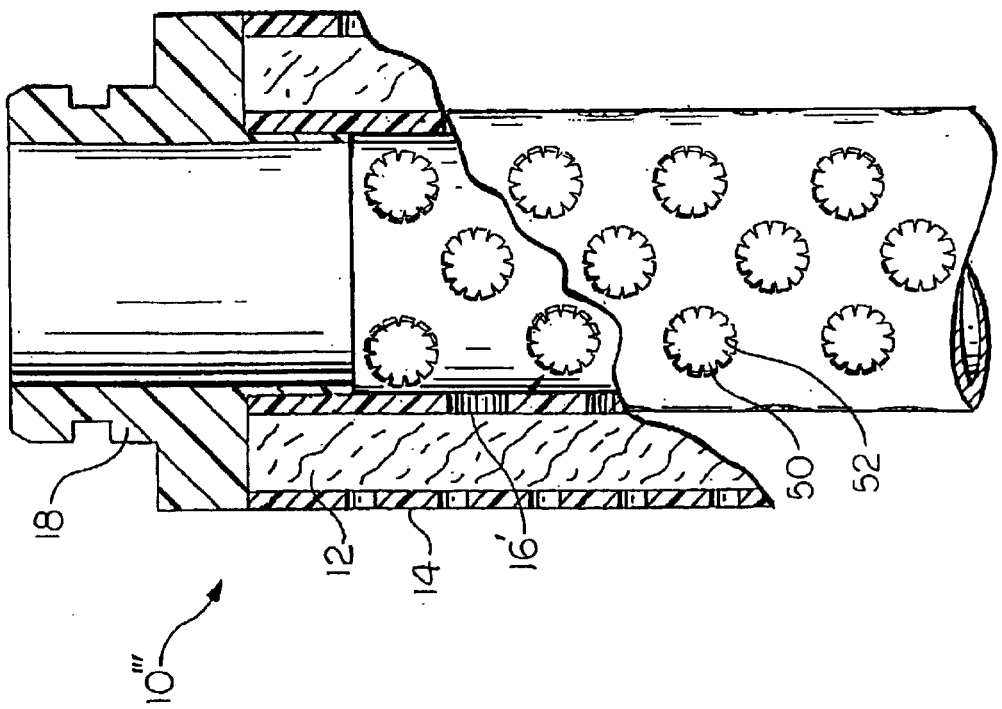
FIG. 4 is a view similar to the other figures discussed above wherein the central tube, formed of an electrically conductive material is provided with a plurality of uniquely shaped perforations.

The embodiment illustrated in FIG. 4 utilizes a cartridge structure substantially the same as described in connection with the embodiments of FIGS. 1, 2, and 3. Accordingly, only the differences will be explained in detail. The cartridge, generally designated by reference numeral 10''' includes a central tube 16' which is provided with a plurality of spaced apart perforations 50 formed with generally radially inwardly extending sharp points 52. The individual points 52 function as lightning rods similar in function to the fibers discussed in respect of the embodiments of FIGS. 1, 2, and 3. While the points 52 may be formed to terminate generally in the plane of the tube 16', it may be desirable to increase the efficiency thereof to cause the points 52 to terminate inwardly of the plane of the tube 16'. It will be understood that the tube 16' will be connected to electrical ground in any suitable fashion.

Due to the insulative nature of the filter material, a high voltage tends to build up which may exceed 50 kV. The voltage draws charges from the pressure vessel, transferring the charge into the fuel. The polarity of the voltage field will cause either electrons to be transferred into the fuel or to exit the fuel; in either case, to neutralize the existing charges present in the fuel.

The end caps may be made from any fuel-compatible, electrically-insulative material. These would include Teflon and its derivatives, polyester, epoxy, some nylons, Delrin, ceramic, glass, and other similar materials. Polyethylene and polypropylene, while exhibiting very good electrical properties, are not adequately compatible with hydrocarbon fuels.

Due to the nature of the application and the sensitive nature of aircraft fueling, the device is a passive device. There are no active neutralization functions, such as electrical power supplies or radiation sources, which would require further maintenance. Although typical charge generation of the filter/monitors is positive polarity, the device of the invention, based on corona discharge, can neutralize either positive or negative charges.

Recent testing has shown that static charge reduction can occur with certain characteristics built into the innermost layers of the monitor. The key requirement is the presence of electrically conductive branched conductors. These branched conductors neutralize charges via corona discharge, by utilizing high voltages built up in the interior of the monitor layers. The branched ends allow opposite charges to transfer into the fuel and neutralize static.

Successful tests have utilized both anti-static tinsel and anti-static cord commonly used for static charge dissipation in paper handling equipment. These materials were wrapped around the current plastic tube, then grounded to the metal vessel holding the monitor cartridge. A voltage field is generated between the media in the monitor cartridge and this anti-static material.

Since the high voltages are present inside the monitor cartridge, any actual static discharges (sparks) that occur are isolated to a location where there is little chance of the presence of oxygen. This eliminates the chances of fuel ignition and fire. Many discharges currently occur between the outside of the filter and nearby metal parts of the vessel. This will likely be eliminated with this design. Static discharges, if they occur, will travel from the highest charging media to the inner anti-stat ends of the branched conductors. Any media damage that may occur due to the sparks is isolated to support media. The important filtering layers, upstream of the support layers, will not be affected. The charges flowing with the fuel (streaming current) are reduced. This lowers the chances of discharges occurring downstream in the manifolds and associated piping.

To emphasize the key characteristics of sharp points, tests were also conducted with metal screen wrapped around the current plastic tube (the screen was also grounded to the vessel). In this case, the charging, as measured by the streaming current (charges flowing with the fuel) actually was higher than the original filter.

The following is typical data, using Jet A fuel with an anti-static additive in the fuel:

Fuel rest conductivity: 15–30 cu (conductivity units or picosiemens/meter)
Filter/monitor: Velcon CDF-230K
Fuel flowrate: 30 gpm
Anti-static feature: See table

| Device design details | Charge generation (uC/cu m*) | Change (%) |
|---|---|---|
| Std CDF-230K | 2400 | — |
| anti-stat cord | 800 | −63 |
| anti-stat tinsel | 1060 | −56 |
| plain metal screen | 3700 | +54 |

*Microcoulombs/cubic meter of fuel

The anti-stat cord, as illustrated in FIG. 2, has more points to neutralize the charge, which results in lower streaming current.

Fuel, as tested, with a rest conductivity of 15–30 cu has now been found to be the highest charging condition. As conductivity is increased from zero, the pro-static nature of the additive increases. Above the 30 cu level, the anti-static nature of the additive starts to reduce the charging.

The anti-stat material could be also woven into a mesh material, drastically increasing the number of neutralizing points.

Those skilled in the art can derive other configurations which could be applied to other configurations of filter elements.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. Apparatus for neutralizing the electrostatic charge in hydrocarbon fluid by comprising:
   a mass of filter material;
   an electrical conductor having a main conductive path and a plurality of cooperating electrically conductive paths extending from the main conductive path and terminating in a pointed configuration spaced from the main conductive path; and
   means for directing the flow of hydrocarbon fluid to be treated through said mass of filter material and in contact with said conductor, whereby the electrostatic charge in the fluid is neutralized by corona discharge.

2. The apparatus defined in claim 1 wherein said conductor is connected to electrical ground.

3. The apparatus defined in claim 2 wherein said conductor is located downstream of said mass of filter material.

4. The apparatus defined in claim 3 wherein said conductor is an anti-static cord.

5. The apparatus defined in claim 4 wherein said conductor is an anti-static tinsel.

6. The apparatus defined in claim 1 wherein said electrical conductor includes a perforated electrically conductive tube with apertures being defined by pointed edges.

7. The apparatus defined in claim 6 wherein the pointed edges extend radially inward from the apertures.

8. The apparatus defined in claim 1 wherein said electrical conductor is formed of an electrically conductive mesh material.

9. The apparatus defined in claim 8 wherein the mesh material is stainless steel.

10. The apparatus defined in claim 8 wherein said mass of filter material surrounds a centrally disposed perforated tube and said mesh material is caused to surround at least a portion of said perforated tube.

11. The apparatus defined in claim 1 wherein said electrical conductor includes electrically connected metal fibers.

12. Apparatus for neutralizing the electrostatic charge in hydrocarbon fluid by comprising:

central perforated tube;

a mass of filter material surrounding said tube;

an electrical conductor interdigitated between said tube and said mass of filter material, said electrical conductor having a main conductive path and a plurality of cooperating electrically conductive paths extending from the main conductive path and terminating in a pointed configuration spaced from the main conductive path; and means for directing the flow of hydrocarbon fluid to be treated through said mass of filter material and in contact with said conductor, whereby the electrostatic charge in the fluid is neutralized by corona discharge.

* * * * *